United States Patent
Vassilev

(10) Patent No.: US 8,745,691 B1
(45) Date of Patent: Jun. 3, 2014

(54) SYSTEM, METHOD, AND COMPUTER PROGRAM PRODUCT FOR PREVENTING COMMUNICATION OF DATA OVER A NETWORK CONNECTION

(75) Inventor: Svetoslav D. Vassilev, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 496 days.

(21) Appl. No.: 12/137,064

(22) Filed: Jun. 11, 2008

(51) Int. Cl.
*G06F 17/00* (2006.01)
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 5,682,478 A * | 10/1997 | Watson et al. | 709/229 |
| 6,044,402 A * | 3/2000 | Jacobson et al. | 709/225 |
| 6,614,800 B1 * | 9/2003 | Genty et al. | 370/464 |
| 7,325,058 B1 * | 1/2008 | Sheth et al. | 709/225 |
| 7,551,895 B1 * | 6/2009 | VanLaningham et al. | 455/41.2 |
| 2005/0003765 A1 * | 1/2005 | Alfano et al. | 455/67.11 |
| 2009/0232086 A1 * | 9/2009 | Li et al. | 370/330 |

OTHER PUBLICATIONS

Schjott, "Symantec Endpoint Protection v11 Tech Track," Symantec Vision Technology Roadshow 2007, Sep. 2007, https://www.emea.symantec.com/vision/dk/viewPDF.cfm?pdfname=Endpoint%20protection%20PS.pdf.
Evers, "Cisco's new security target: consumers," CNET News.com, Feb. 13, 2007, news.cnet.com/Ciscos-new-security-target-consumers---page-2/2100-1029_3-6158757-2.html.
Kirst, "Infobit 2007—Save the Bit," Symantec Corporation, 2006, www2.comsoft.ch/eservice/Download/DocNewsletter/770168cb-34b7-4439-a6e6-1af4fc3994cc.pdf.

* cited by examiner

*Primary Examiner* — Dant Shaifer Harriman
(74) *Attorney, Agent, or Firm* — Wong, Cabello, Lutsch, Rutherford & Brucculeri, LLP

(57) ABSTRACT

A system, method, and computer program product are provided for preventing communication of data over a network connection. In use, a plurality of network connections that exist for a device is identified. Furthermore, data is conditionally prevented from being communicated over at least one of the network connections of the device, based on the identification.

20 Claims, 6 Drawing Sheets

SYSTEM, METHOD, AND COMPUTER PROGRAM PRODUCT FOR PREVENTING COMMUNICATION OF DATA OVER A NETWORK CONNECTION

FIELD OF THE INVENTION

The present invention relates to network connections, and more particularly to network connections that exist on a device.

BACKGROUND

Traditionally, devices (e.g. computers, etc.) have been capable of being connected to different networks. Such devices have generally connected to networks for communicating data over the networks. However, the ability of devices to connect to different networks in parallel has posed various security issues. Just by way of example, devices employing network connections to different networks simultaneously may be utilized as a bridge between such networks, thus potentially enabling an unwanted communication of data from one network to another network.

There is thus a need for addressing these and/or other issues associated with the prior art.

SUMMARY

A system, method, and computer program product are provided for preventing communication of data over a network connection. In use, a plurality of network connections that exist for a device is identified. Furthermore, data is conditionally prevented from being communicated over at least one of the network connections of the device, based on the identification.

DETAILED DESCRIPTION

Figure 1:
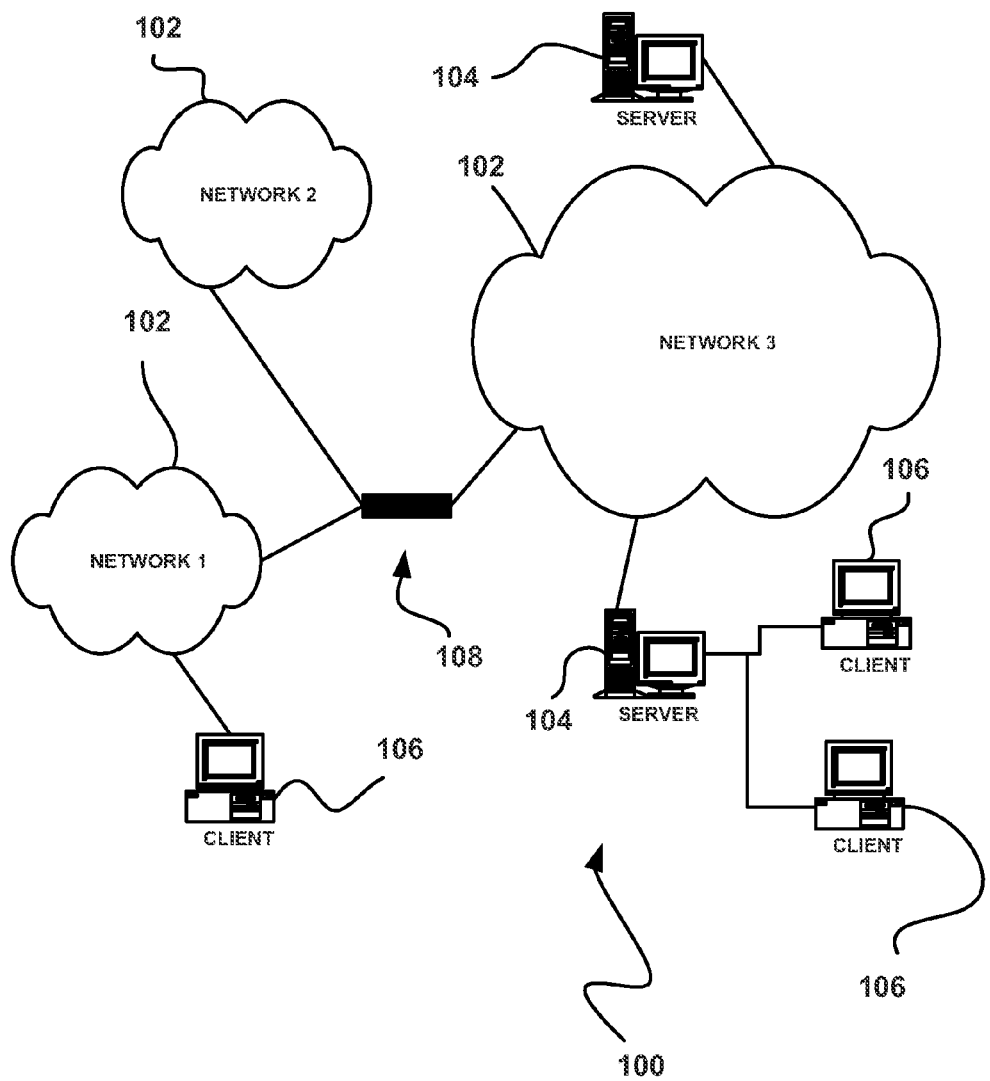
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
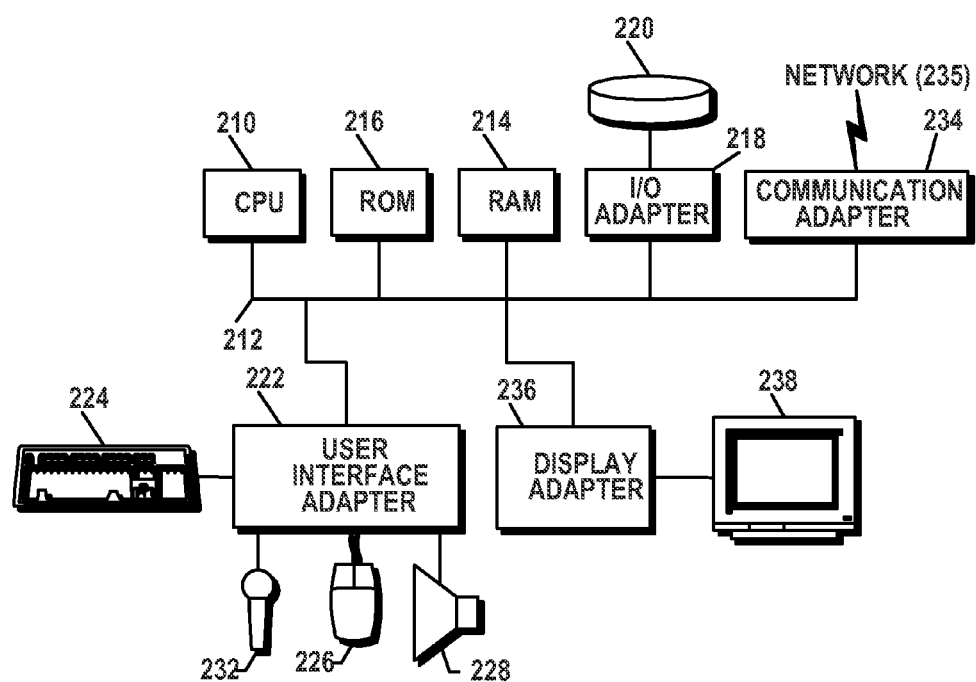
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
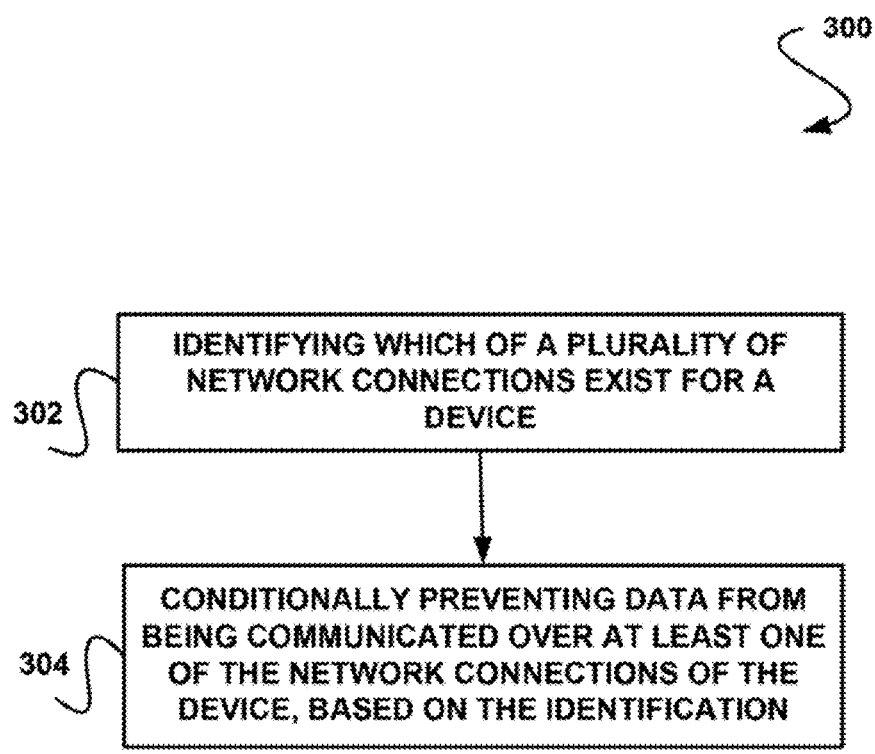
FIG. 3 shows a method for preventing communication of data over a network connection, in accordance with one embodiment.

FIG. 3 shows a method 300 for preventing communication of data over a network connection, in accordance with one embodiment. As an option, the method 300 may be carried out in the context of the architecture and environment of FIGS. 1 and/or 2. Of course, however, the method 300 may be carried out in any desired environment.

As shown in operation 302, a plurality of network connections that exist for a device is identified. In the context of the present description, the device may include any type of device capable of having multiple network connections. For example, the device may include a mobile device (e.g. mobile telephone, lap-top computer, PDA, etc.) and/or any of the other devices described above with respect to FIGS. 1 and/or 2.

In addition, each of the network connections may include any connection that may exist for allowing the device to connect to a network. Such network may include any of the networks described above with respect to FIG. 1, for example. To this end, in various embodiments, the network connections may include a wired network connection, a wireless network connection, etc.

Optionally, each of the network connections may exist for the device if the device is connected to an associated network via the network connection. For example, each of the network connections may exist for the device if a network adapter (e.g. network interface card, etc.) of the device is connected to an associated network. Accordingly, each of the network connections that exist for the device may be capable of being utilized by the device for sending and/or receiving data over an associated network.

In one embodiment, identifying which of the network connections exist for the device may include identifying at least one network to which the device is connected. Just by way of example, the network connections that exist for the device may be identified by identifying networks over which data is communicated to the device and/or from the device. Such data may include packets.

In another embodiment, the network connections that exist for the device may be identified by extracting information from the network adapter of the device. The information may include any information capable of being utilized to identify network connections that exist for the device. For example, the information may include a domain name of a network associated with each of the network connections that exist for the device, a physical medium (e.g. wired, wireless, etc.) utilized by the network adapter for the network connections that exist for the device, an internet protocol (IP) address of the network adapter, a gateway via which the network adapter connects to a network, a dynamic host configuration protocol (DHCP)/IP address of a network to which the network adapter is connected, etc. Of course, however, the network connections that exist for the device may be identified in any desired manner.

Furthermore, as shown in operation 304, data is conditionally prevented from being communicated over at least one of the network connections of the device, based on the identification. Thus, the data may optionally be conditionally prevented from being communicated over at least one of the network connections identified as existing for the device. As noted above, the data may include packets.

In one embodiment, the data may be conditionally prevented from being communicated over at least one of the network connections of the device based on a rule. For example, the rule may indicate at least one characteristic of a network connection over which the data is to be prevented from being communicated. In this way, if a characteristic of a network connection of the device matches the characteristic indicated by the rule, the data may be prevented from being communicated over such network connection of the device.

In as another example, the rule may indicate at least one characteristic of a network connection over which the data is allowed to be communicated. Accordingly, with respect to such example, if a characteristic of a network connection of the device matches the characteristic indicated by the rule, the data may be allowed to be communicated over the network connection of the device. The characteristic indicated by the rule may include any characteristic capable of being associated with a network connection (e.g. a domain name of an associated network, an IP address range, a physical medium utilized by a network adapter, etc.).

In another embodiment, the data may be prevented from being communicated over at least one of the network connections of the device if at least two network connections are identified as existing for the device. For example, the data may be prevented from being communicated over a first one of the network connections of the device if a second one of the network connections exists for the device. As an option, if a plurality of network connections is identified as existing for the device, then the data may be conditionally prevented from being communicated over at least one of such network connections of the device based on a policy.

The policy may indicate that the data is to be prevented from being communicated over the first one of the network connections if the first one of the network connections is non-compliant with parameters of the policy and the second one of the network connections is compliant with parameters of the policy. Just by way of example, the parameters of the policy may indicate a range of IP addresses within which a network adapter of the device is allowed to be included. Thus, if the network adapter is outside of the range for the first one of the network connections, but is within the range for the second one of the network connections, data may be prevented from being communicated over the first one of the network connections.

As another example, the parameters of the policy may indicate a domain name of a network to which the device is allowed to be connected. Thus, if the first one of the connections of the device is not associated with the domain name, but the second one of the connections of the device is associated with the domain name, data may be prevented from being communicated over the first one of the network connections. Of course, as another option, the data may be allowed to be communicated over the first one of the network connections of the device if the second one of the network connections does not exist for the device.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
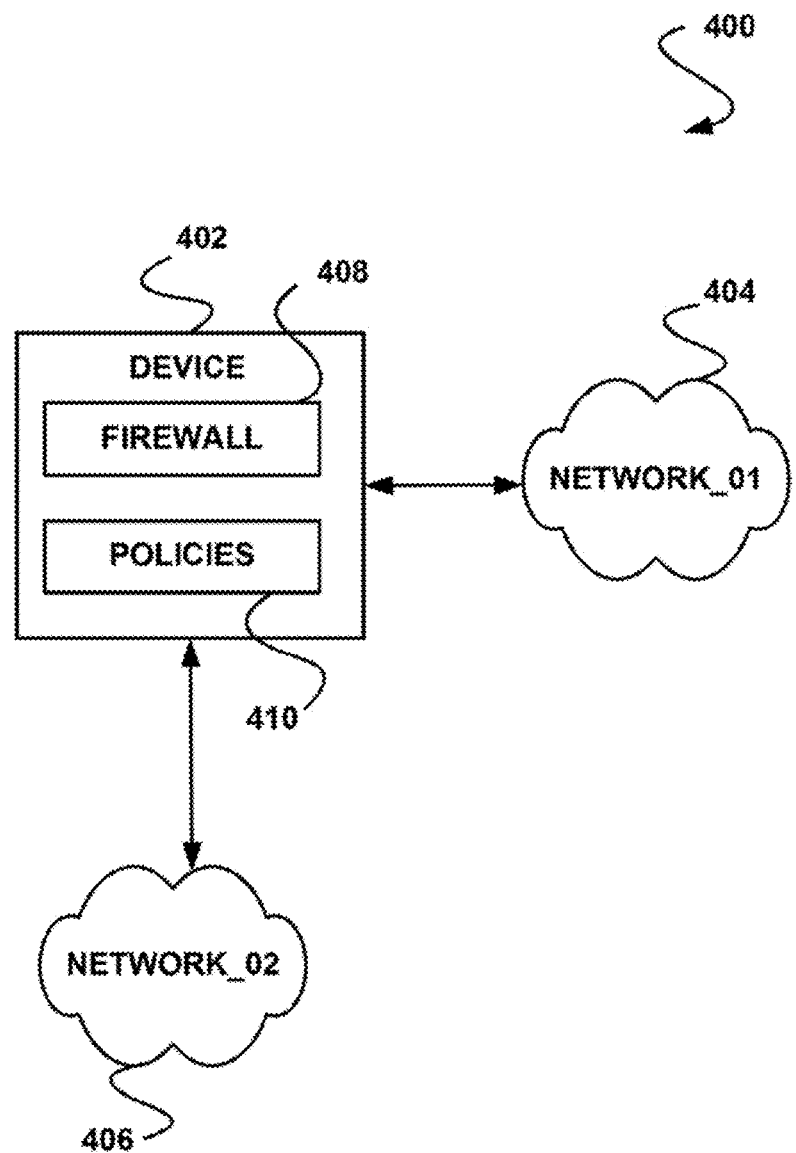
FIG. 4 shows a system for preventing communication of data over a network connection, in accordance with another embodiment.

FIG. 4 shows a system 400 for preventing communication of data over a network connection, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a device 402 is in communication with a first network 404 and a second network 406. While only two networks are shown, it should be noted that the device 402 may be in communication with any number of different networks. To this end, a plurality of network connections (e.g. to the networks 404, 406) may exist for the device 402.

The device 402 includes a firewall 408 and a plurality of policies 410. The firewall 408 may include any software component installed on the device 402 that is capable of filtering data received by the device 402 and/or communicated by the device 402 over the first network 404 and/or the second network 406. As an option, the firewall 408 may intercept data received by the device 402 and/or communicated by the device 402 over the first network 404 and/or the second network 406.

Additionally, the firewall 408 may utilize the policies 410 for filtering such data. With respect to the present embodiment, the policies 410 may each include a different set of rules for filtering the data. Just by way of example, the policies 410 may include rules indicating characteristics of network connections over which data is allowed to be communicated and/or over which data is not allowed to be communicated.

Thus, each rule may optionally include a set of parameters (e.g. such as direction, protocol, ports, etc.) and an associated action (e.g. block, allow, etc.). Further, network traffic communicated over a network connection of the device 402 which meets the parameters of a rule may be filtered according to the action indicated by the rule. For example, link-layer, network and/or protocol layer headers of packets included in the network traffic may be compared to the parameters of a rule for determining whether such network traffic meets the parameters of the rule.

As another option, the policies 410 may include predetermined sets of rules (hereinafter referred to as connection-aware groups) that are particular to network connections with parameters indicated by the predetermined sets of rules. For example, each of the connection-aware groups, and thus the rules included therein, may only be applied to data communicated over network connections with parameters matching the parameters indicated by the associated connection-aware group.

The parameters indicated by the connection-aware groups may include IP address, IP range, IP network defined in a classless inter-domain routing (CIDR) notation, domain name of the network, IP address of the domain name system (DNS) and/or dynamic host configuration servers, network adapter physical medium, etc. Thus, if it is determined that parameters of a network connection match parameters of a connection-aware group, each of the rules in the connection-aware group may be traversed for determining whether data communicated over the network connection complies with the rules.

Further, the policies 410 may include an isolation rule for preventing communication of data over a first network connection of the device 402 when a second network connection of the device 402 exists. The isolation rule may be enabled for any one of the connection-aware groups (e.g. manually, etc.). In one embodiment, the isolation rule may only allow data to be communicated over a network connection of the device 402 if the network connection matches the parameters indicated by the associated connection-aware group, the data complies with the policies 410 of the device 402 and the data complies with the rules indicated by the associated connection-aware group. Thus, communication of any other type of data may be prevented.

To this end, enabling the isolation rule (e.g. based on input received by a user, etc.) may allow data communicated over a first network connection of the device 402 which is non-compliant with the parameters of an associated connection-aware group to be prevented when a second network connection of the device 402 that is compliant with such parameters exists. Just by way of example, the isolation rule may allow data to be communicated over a first network connection of the device 402 that is associated with a secured corporate LAN while preventing data from being communicated over a second network connection of the device 402 that is associated with a wireless network.

As another example, a network connection of the device 402 exists which matches parameters of a connection-aware group, the firewall 408 may apply the rules of the connection-aware group (e.g. from a first rule to a last rule of the connection-aware group) to data communicated over such network connection for determining whether the data complies with the rules. In this way, the data may be filtered according to compliance of the data with the rules of the connection-aware group.

If a network connection of the device 402 exists which does not match parameters of a connection-aware group and the isolation rule is not enabled, the firewall 408 will not apply the rules of the connection-aware group to data communicated over such network connection and may instead apply other rules to the data (e.g. based on an order of the rules) for determining whether to block the data from being communicated over the network connection, in one embodiment. The other rules may optionally include stand alone rules (e.g. rules not included in a connection-aware group) included in the policies 410 of the device 402.

As still yet another example, if a first network connection of the device 402 exists which does not match parameters of a connection-aware group, the isolation rule is enabled, and at least one other network connection of the device 402 exists which matches the parameters of the connection-aware group, data may be prevented from being communicated over the first network connection. In this way, undesirable data otherwise capable of being communicated over a first network connection of the device 402 may be prevented, thus preventing access by such data to a predetermined network via a second network connection of the device 402.

To this end, the policies 410 of the device 402 may by utilized by the firewall 408 to allow the device 402 to be connected to a secured corporate LAN while enforcing a predetermined rule set, and in parallel to block all data communicated over other network connections. As another example, the policies 410 of the device 402 may by utilized by the firewall 408 to allow the device 402 to be connected to a remote LAN while enforcing a predetermined rule set (e.g. with more rules than the first rule set), such that a user of the device 402 may perform predetermined tasks via such network connection [e.g. browsing the Internet, establishing a virtual private network (VPN) tunnel to the secured corporate LAN, etc.].

As yet another example, the policies 410 of the device 402 may by utilized by the firewall 408 to allow the user to establish a VPN tunnel to the corporate LAN from a remote network, but may prevent data from any outside network to enter the device 402 while the VPN tunnel is active. In this way, adaptive anti-bridging protection may be provided by preventing a connection between various networks via the device 402.

As an option, a state table may be utilized by the firewall 408 for reducing resource consumption. The firewall 408 may cache information about network connections [e.g. transmission control protocol (TCP) connections, user datagram protocol (UDP), etc.] existing for the device 402 in the state table. If data attempted to be communicated over one of the network connections matches a connection identifiable by information in the state table, the communication of the data over the network connection may be automatically allowed.

It should be noted that the state table may be populated in any desired manner. For example, in one embodiment, the state table may be populated with information about a network connection if a packet communicated over the network connection is allowed by the firewall 408 based on the policies 410. Accordingly, the state table may be utilized for reducing a performance impact associated with filtering data at least attempted to be communicated over network connections of the device 402 by preventing an exhaustive rule matching process from being repeatedly performed for a single network connection.

As another option, an effective connection-aware group may be identified for reducing resource consumption. The firewall 408 may optionally monitor network configurations associated with networks to which the device 402 is connected for identifying changes to such network configurations. Once a network configuration change is identified, the firewall 408 may query an operating system of the device 402 for information about parameters of network connections existing for the device 402.

The firewall 408 may further compare the parameters to each connection-aware group included in the policies 410 of the device 402. To this end, each connection-aware group may be associated with a separate cache which stores an index for each network connection that matches the parameters of such connection-aware group. The cache may be deleted and re-created each time an IP configuration change is identified, as an option. In this way, connection-aware groups that are applicable to network connections existing for the device 402 may be automatically identified and applied to data attempted to be communicated over such network connection. For example, traversal of connection-aware groups included in the policies 410 upon each attempted communication of data over a network connection for determining whether any such connection-aware groups are applicable to network connections of the device 402 may be prevented.

In one exemplary embodiment, if a user does not want data being communicated over a network connection associated with an external network (e.g. non-corporate network) when a network connection to an internal network (e.g. corporate network) exists, a connection-aware group may be generated with a DNS suffix of the internal network. Additionally, the connection-aware group may be placed at the beginning of one of the policies 410 and the isolation rule for the connection-aware group may be enabled. Accordingly, if a user of the device 402 enters an office and connects to the internal network, but the device 402 is still connected to an external network, the data communicated over the external network will be blocked in response to the device 402 obtaining an IP address from the internal network.

In another exemplary embodiment, a user may want to be allowed to separately browse the Internet and establish a VPN connection to a specific internal network, such that once a first connection with either the Internet or the internal network is established, data is prevented from being communicated over a network connection associated with the other network. As an option, a policy may be created which begins with rules enabling the creation of the VPN tunnel [e.g. allow Internet key exchange (IKE) and IP security (IPsec) encapsulating security payload (ESP) traffic]. The VPN rules may be followed by a connection-aware group with an associated isolation rule enabled and a DNS suffix for the internal network.

Additionally, the connection-aware group may include rules for interacting with the internal network. Further, the connection-aware group may be followed by a rule allowing outbound TCP traffic to ports 80 and 443. Any other rules may follow, as desired. To this end, whenever the user connects to an external network the user may be able to browse the Internet as well as establish a VPN tunnel to the internal network. Data communicated over the VPN will be allowed based on the rules preceding the connection-aware group. Further, once the VPN tunnel is established any data communicated over a network connection to the external network may be blocked based on the enabled isolation rule. As an option, the firewall 408 may still allow IKE and ESP network traffic for preventing the VPN tunnel from collapsing, however any data communicated over the VPN may be matched against the rules in the connection-aware group.

Figure 5:
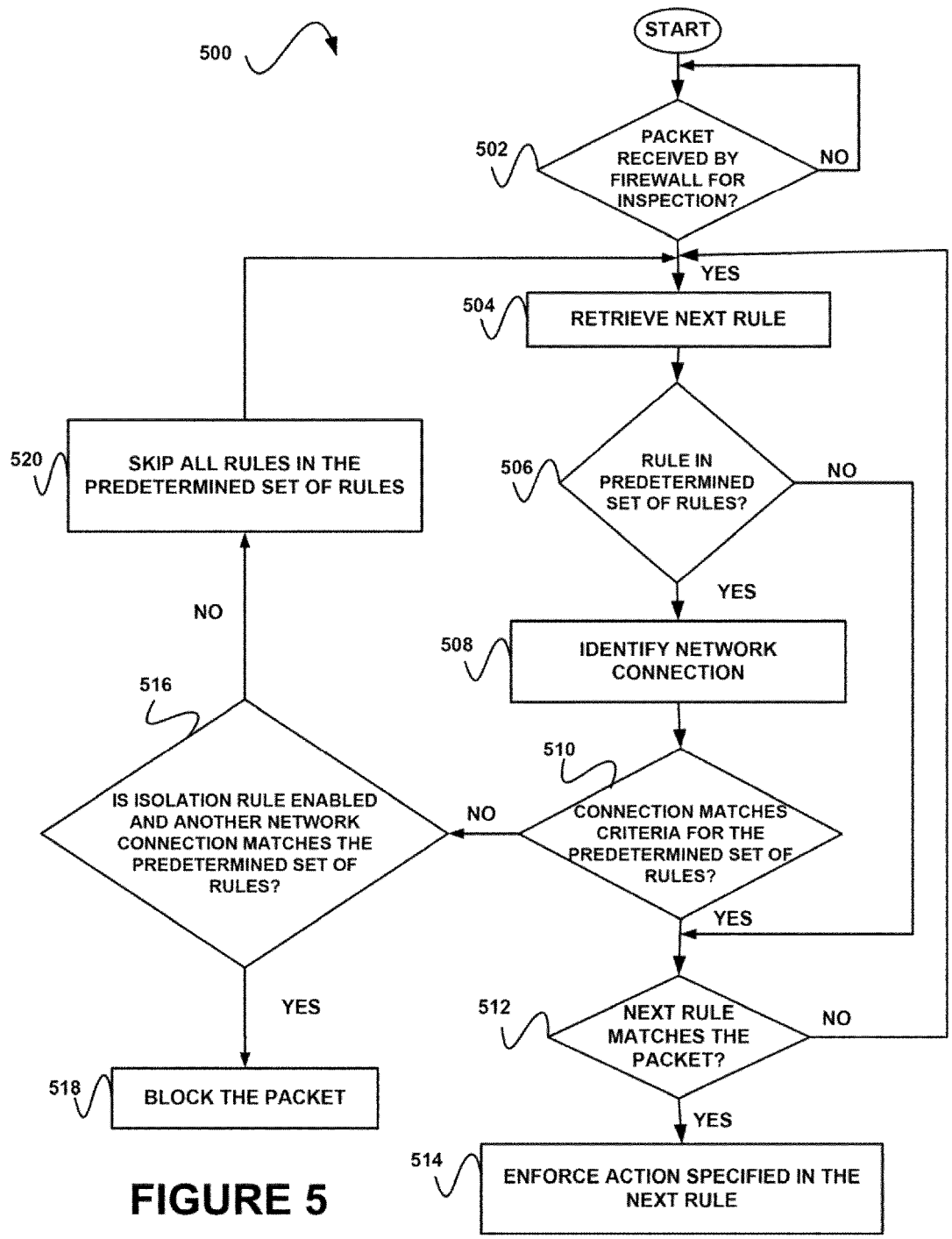
FIG. 5 shows a method for blocking receipt of a packet by a device when multiple network connections of a device exist, in accordance with yet another embodiment.

FIG. 5 shows a method 500 for blocking receipt of a packet by a device when multiple network connections of a device exist, in accordance with yet another embodiment. As an option, the method 500 may be carried out in the context of the architecture and environment of FIGS. 1-4. For example, the method 500 may be carried out utilizing the firewall 408 of FIG. 4. Of course, however, the method 500 may be carried out in any desired environment. Again, it should be noted that the aforementioned definitions may apply during the present description.

As shown in decision 502, it is determined whether a packet is received by a firewall for inspection. In one embodiment, the packet may be received by the firewall by being intercepted by the firewall. For example, the firewall may intercept packets attempted to be communicated over a network connection of a device on which the firewall is located.

If it is determined that a packet is not received by the firewall for inspection, the method waits for receipt of such a packet. If, however, it is determined that a packet is received by the firewall for inspection, a next rule is retrieved. Note operation 504. The next rule may be retrieved from a policy of the device. Additionally, in response to receipt of the packet by the firewall, the next rule that is retrieved may be the first rule included in the policy.

Further, it is determined whether the next rule is in a predetermined set of rules, as shown in operation 506. For example, the firewall may determine whether the next rule belongs to a connection-aware group. Such determination may be made by traversing the connection-aware groups of the device for identifying such next rule, in one embodiment.

If it is determined that the next rule is included in a connection-aware group, a network connection on which the packet was received is identified. Note operation 508. As an option, parameters associated with the network connection may also be identified, such as an associated IP address, gateway IP address, connection-specific DNS suffix, adapter physical medium, etc.

Moreover, it is determined whether the network connection matches criteria for the predetermined set of rules, as shown in decision 510. For example, the firewall may match the parameters of the network connection with criteria included in the predetermined set of rules. The criteria included in the predetermined set of rules may be defined by the user, as an option.

If it is determined that the network connection matches criteria for the predetermined set of rules (decision 510), or if it is determined that the next rule is not in the predetermined set of rules (decision 506) it is determined whether the next rule matches the packet. Note decision 512. Just by way of example, the firewall may determined whether parameters of the next rule match the corresponding fields from the link-layer, network, and/or transport protocol headers of the packet.

If it is determined that the next rule does not match the packet, another next rule is retrieved (operation 504). If, however, it is determined that the next rule matches the packet, an action specified in the next rule is enforced. Note operation 514. The action may be to block the packet (e.g. prevent the packet from being communicated over the network connection), in one embodiment. In another embodiment, the action may be to allow the packet (e.g. allow the packet to be communicated over the network connection).

If the network connection does not match the criteria for the predetermined set of rules (decision 510), it is determined whether an isolation rule is enabled and whether there is another network connection that matches the predetermined set of rules. Note decision 516. In this way, it may be determined whether any network connections that match the criteria of the predetermined set of rules are to be isolated, such that data is prevented from being communicated over the network connection over which the packet was attempted to be communicated.

If it is determined in decision 516 that an isolation rule is enabled and that there is another network connection that matches the predetermined set of rules, the packet is blocked. Note operation 518. In this way, the packet may be automatically blocked. If, however, it is determined that an isolation rule is not enabled and/or that there is not another network connection that matches the predetermined set of rules, matching of the rules in the predetermined set of rules to the packet is prevented. Furthermore, another next rule is retrieved (operation 504). The other next rule may include a rule immediately following the predetermined set of rules, as an option.

In one exemplary embodiment, a user may defines one predetermined set of rules, the isolation rule may be enabled and the predetermined set of rules may have only one criterion—DNS suffix "*.corp.com" (i.e. all the network connections, whose DNS suffix ends with ".corp.com" will match the criteria for the predetermined set of rules). The rules within the predetermined set of rules may accordingly be applied to a device with a wireless and wired network adapter.

Thus, if the user goes to the airport and picks up a wireless network signal from the airport hot spot, the wireless connection will not match the criteria for the predetermined set of rules, so all the wireless traffic will not be matched against the rules in the predetermined set of rules. However, since the wired adapter is not connected, the wireless traffic will be matched to all of the rules that follow the predetermined set of rules.

As another option, the user may enter an office and connects the wired adapter of a device to "sales.corp.com", while at the same time the wireless adapter of the device may connect to a remote hot spot. If there is no matching rule that precedes the predetermined set of rules, data communicated over the wireless adapter may be automatically dropped because the wired adapter is connected to a network that matches the predetermined set of rules and the user has elected to isolate all the ".corp.com" connections.

In another exemplary embodiment, policies employed by the firewall may contain rules and groups in the order shown in Table 1. It should be noted that the rules and groups shown in Table 1, along with the ordering thereof, are set forth for illustrative purposes only, and thus should not be construed as limiting in any manner.

TABLE 1

| | |
|---|---|
| 1. | Rules for basic connection |
| 2. | VPN connection rules |
| 3. | predetermined set of rules (connection-aware group) with corporate LAN connection rules |
| 4. | predetermined set of rules (connection-aware group) with VPN connection rules |

In one embodiment, an isolation rule may be enabled for a corporate LAN network. Thus, connection rules may be processed until the predetermined set of rules with the corporate LAN connection rules is encountered. The predetermined set of rules with the corporate LAN connection rules may include criteria shown in Table 2. It should be noted that the criteria shown in Table 2 is set forth for illustrative purposes only, and thus should not be construed as limiting in any manner.

TABLE 2

| | |
|---|---|
| Connection type = | LAN |
| DNS suffix = | mycompany.com |
| Isolate this Connection = | yes |

To this end, if a device has both LAN and wireless network adapters may connect to the corporate network with a wired connection and a wireless network with a wireless connection simultaneously. The wired LAN connection may be active and meets the criteria of the predetermined set of rules for the corporate LAN. Thus, the firewall processes network traffic communicated over the LAN but because the isolation rule is enabled, all other traffic not communicated over the LAN may be blocked.

In another embodiment, an isolation rule may be enabled for a hotel network capable of being accessed via a VPN connection. Connection rules may be processed until the predetermined set of rules with VPN connection rules is encountered. The predetermined set of rules with the VPN connection rules may include criteria shown in Table 3. It should be noted that the criteria shown in Table 3 is set forth for illustrative purposes only, and thus should not be construed as limiting in any manner.

TABLE 3

| | |
|---|---|
| Connection type = | Any |
| DNS suffix = | vpn.mycompany.com |
| IP Address = | an address in a range specific to the VPN concentrator |
| Isolate this Connection = | yes |

General connection rules may allow the set-up of a timed account at the hotel to gain Internet access. Additionally, the VPN connection rules may allow connection and use of the VPN tunnel. After the tunnel is established, the VPN client may create a virtual adapter that matches the criteria of the predetermined set of rules with the VPN connection rules. Thus, the firewall may only allow data to be communicated over the VPN tunnel and data to be communicated over the actual adapter. Attempts by other users to access to the device over the hotel network, either wired or wireless, may be blocked.

Figure 6:
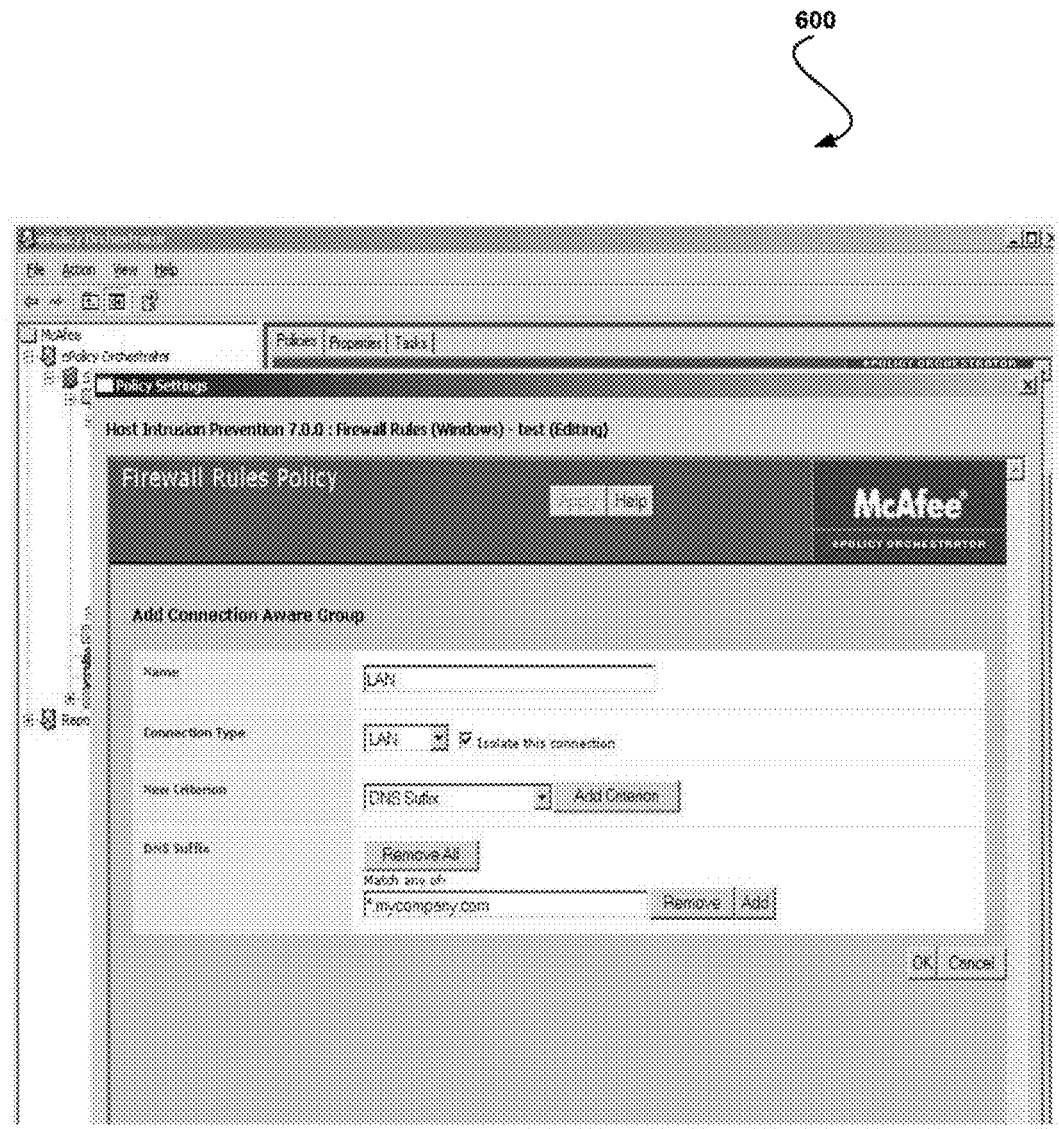
FIG. 6 shows a graphical user interface for creating a predetermined set of rules utilized for preventing communication of data over a network connection, in accordance with still yet another embodiment.

FIG. 6 shows a graphical user interface (GUI) 600 for creating a predetermined set of rules utilized for preventing communication of data over a network connection, in accordance with still yet another embodiment. As an option, the GUI 600 may be carried out in the context of the architecture and environment of FIGS. 1-4. Of course, however, the GUI 600 may be carried out in any desired environment. Again, it should be noted that the aforementioned definitions may apply during the present description.

With respect to the present embodiment, the GUI 600 may be utilized for creating a predetermined set of rules (a connection-aware group). The predetermined set of rules may be configured to apply to data communicated over a wired, wireless, and/or non-specific network connection with predefined parameters. Predetermined sets of rules may appear in a rule list (e.g. in a predetermined color font) and may be preceded by an arrow. Selecting the arrow may show or hide the rules within the predetermined set of rules, as an option.

To create a new predetermined set of rules, an option on a policy GUI may be selected. In response to selection of such option, the GUI 600 may be presented. The GUI 600 may include a plurality of fields for allowing input to be entered therein. For example, the input may specify criteria for the types of network connections to which the predetermined set of rules is to be applied.

The GUI 600 may include a name field for allowing a user to enter a name for the predetermined set of rules. In addition, the GUI 600 may include a connection type field for allowing the user to enter a type of connection (e.g. LAN, wireless, any) to which the predetermined set of rules is to be applied. Further, the GUI 600 may include an option to enable an isolation rule for the predetermined set of rules. Enabling the isolation rule may allow the communication of data over network connections that do not meet the criteria of the predetermined set of rules to be prevented.

Still yet, the GUI 600 may include a criterion drop down list for allowing the user to select a category of criterion to apply to the rule. Once a criteria category from the criterion drop down list is selected by the user, the user may further select an additional criterion option for displaying a criteria field to allow the user to enter the criteria for the criteria category therein. As an option, if a user selects "Any" as the connection type in the connection type field, the user may optionally be required to select either the IP address category or the DNS suffix category of the criterion drop down list and edit the corresponding entry.

As another option, the user may be allowed to specify a DHCP server media access control (MAC) address only for DHCP servers on the same subnet as the device for which the predetermined set of rules is created. Remote DHCP servers may optionally only be identified by their associated IP address. The user may further select the additional criterion option for displaying the criteria field to allow the user to enter additional criteria for the selected criteria category. In this way, multiple criteria may be specified for a single criteria category.

A remove option may also be provided via the GUI 600 for allowing the user to remove all or only a portion of criteria associated with a criteria category. Once the user selects the "OK" option, the configured predetermined set of rules may be stored for use by a firewall of the device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer program product comprising instructions stored thereon, the instructions when executed cause one or more processors to:
   identify a first network connection capable of communicating data from a device to a first network;
   identify availability of a second network connection from the device to a second network, wherein the first and second network are different networks, the first and second network connections exist at the same time; and
   prevent any network traffic from being communicated from the device over the first network connection, based in part on the identification of availability of the second network connection.

2. The computer program product of claim 1, wherein the device includes a mobile device.

3. The computer program product of claim 1, wherein at least one of the first and second network connections include a wired network connection.

4. The computer program product of claim 1, wherein at least one of the first and second network connections include a wireless network connection.

5. The computer program product of claim 1, wherein the instructions to cause one or more processors to identify the first network connection or availability of the second network connection comprise instructions to cause one or more processors to identify at least one network to which the device is connected.

6. The computer program product of claim 1, wherein the instructions to cause one or more processors to identify the first network connection or availability of the second network connection comprise instructions to cause one or more processors to determine information from a network adapter of the device.

7. The computer program product of claim 1, wherein the instructions to cause one or more processors to identify the first network connection or availability of the second network connection further comprise instructions to cause one or more processors to determine a domain name of a network associated with the first or second network connections.

8. The computer program product of claim 6, wherein the instructions to cause one or more processors to identify the first network connection or availability of the second network connection further comprise instructions to determine a physical medium utilized by the network adapter for the first or second network connections.

9. The computer program product of claim 6, wherein the instructions to cause one or more processors to identify the first network connection or availability of the second network connection further comprise instructions to cause one or more processors to determine an internet protocol address of the network adapter.

10. The computer program product of claim 1, wherein the instructions to cause one or more processors to prevent any network traffic from being communicated from the device over the first network connection comprise instructions to cause one or more processors to conditionally prevent any network traffic from being communicated over the first network connection based on a rule.

11. The computer program product of claim 10, wherein the rule indicates at least one characteristic of a network connection over which the any network traffic is to be prevented from being communicated.

12. The computer program product of claim 10, wherein the rule indicates at least one characteristic of a network connection over which network traffic is allowed.

13. The computer program product of claim 1, wherein the instructions to cause one or more processors to prevent any network traffic from being communicated from the device over the first network connection comprise instructions to cause one or more processors to prevent any network traffic over the first network connection of the device based on existence of the second network connection.

14. The computer program product of claim 1, wherein the second network connection is compliant with parameters of a policy and the first network connection is non-compliant with the parameters of the policy.

15. The computer program product of claim 14, wherein the parameters of the policy indicate a range of internet protocol addresses within which a network adapter of the device is allowed to be included.

16. The computer program product of claim 14, wherein the parameters of the policy indicate a domain name of a network to which the device is allowed to be connected.

17. The computer program product of claim 1, wherein the instructions to cause one or more processors to prevent any network traffic from being communicated further comprise instructions to cause one or more processors to allow network traffic to be communicated over the first network connection of the device, when the first network connection is not associated with a first domain name, if the second network connection associated with the first domain name does not exist for the device.

18. A method, comprising:
   identifying, using one or more processors, a first network connection capable of communicating data from a device to a first network;
   identifying, using one or more processors, availability of a second network connection from the device to a second network, wherein the first and second networks are different networks, the first and second network connections exist at the same time; and preventing any network traffic from being communicated from the device over the first network connection, based in part on the identification of the availability of the second network connection.

19. A system, comprising:

a memory; and one or more processors coupled to the memory, the one or more processors adapted to execute instructions stored in the memory to:
  identify a first network connection capable of communicating data from a device to a first network;
  identify availability of a second network connection from the device to a second network, wherein the first and second network are different networks, the first and second network connections exist at the same time; and
prevent any network traffic from being communicated from the device over the first network connection, based in part on the identification of availability of the second network connection.

20. The computer program product of claim 1, wherein the second network comprises a virtual private network communicating over the same physical network as the first network.

* * * * *